United States Patent [19]

Olper et al.

[11] Patent Number: 5,106,466
[45] Date of Patent: Apr. 21, 1992

[54] PROCESS FOR THE INTEGRAL RECOVERY OF THE SULPHUR CONTAINED IN SPENT LEAD BATTERIES, OBTAINED IN THE FORM OF PURE SULPHURIC ACID FOR REUSE IN THE PRODUCTION OF NEW BATTERIES

[75] Inventors: Marco Olper; Pierluigi Fracchia, both of Milan, Italy

[73] Assignee: B.U.S. Engitec Servizi Ambientali S.r.l., Milan, Italy

[21] Appl. No.: 690,349

[22] Filed: Apr. 24, 1991

[30] Foreign Application Priority Data

Apr. 26, 1990 [IT] Italy ................................ 20134 A/90

[51] Int. Cl.$^5$ ............................ C25B 1/00; C25B 1/22
[52] U.S. Cl. ...................................... 204/98; 204/104;
204/114; 204/115; 429/49
[58] Field of Search ................. 204/98, 104, 114, 115;
429/49

[56] References Cited

U.S. PATENT DOCUMENTS

| | | | |
|---|---|---|---|
| 4,269,810 | 5/1981 | Kolakowski | 423/92 |
| 4,460,442 | 7/1984 | Ducati | 204/114 |
| 4,528,173 | 7/1985 | Seamans | 204/104 |
| 4,655,928 | 4/1987 | Milton et al. | 204/130 |
| 4,769,116 | 9/1988 | Olper et al. | 204/114 |
| 4,927,510 | 5/1990 | Olper et al. | 204/114 |

*Primary Examiner*—John Niebling
*Assistant Examiner*—David G. Ryser
*Attorney, Agent, or Firm*—Foley & Lardner

[57] ABSTRACT

A process is disclosed for recovering the components of spent lead acid batteries of the type comprising an active mass desulphurization stage in which sodium sulphate is formed, characterized in that the sodium sulphate solution thus formed is fed to an electrolysis stage in which a soda solution is produced at the cathode and a sulphuric acid solution is produced at the anode. The soda solution produced at the cathode is recycled to the active mass desulphurization stage, and the sulphuric acid solution produced at the anode is recovered for reuse as battery electrolyte in the production of new lead acid batteries.

9 Claims, 1 Drawing Sheet

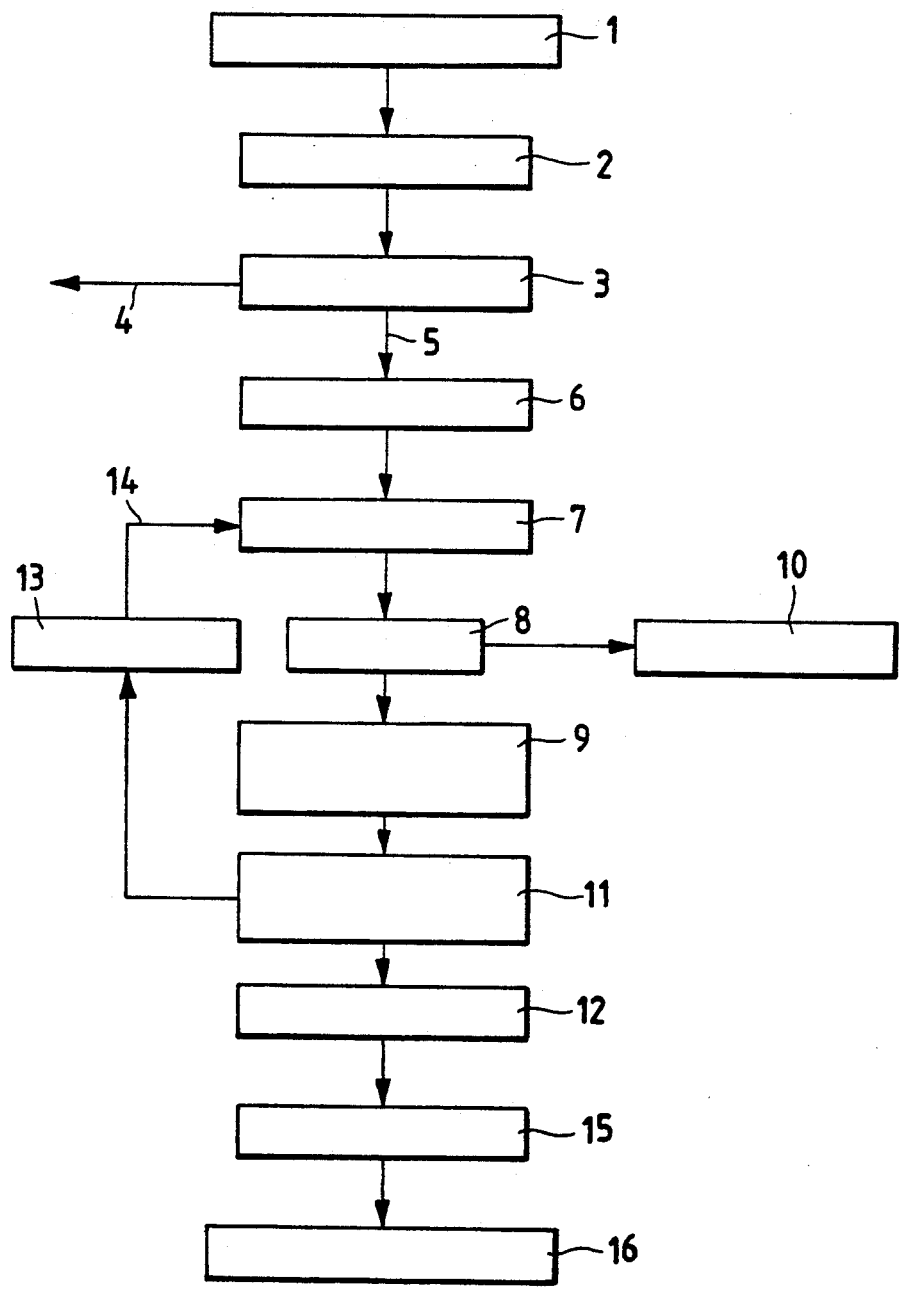

PROCESS FOR THE INTEGRAL RECOVERY OF THE SULPHUR CONTAINED IN SPENT LEAD BATTERIES, OBTAINED IN THE FORM OF PURE SULPHURIC ACID FOR REUSE IN THE PRODUCTION OF NEW BATTERIES

BACKGROUND OF THE INVENTION

In spent lead acid battery recovery processes it is known to generally eliminate the sulphuric acid, a constituent of the electrolyte, and the sulphur, a constituent of the lead sulphate contained in the active mass, by treatment with alkaline or alkaline earth carbonate or bases. If for example sodium carbonate is used, sodium sulphate is formed during the treatment. The $Na_2SO_4$ solutions are generally fed to the heavy metal removal plant and then discharged.

Only in certain more modern plants are the $Na_2SO_4$ solutions fed after purification to a plant in which the pure anhydrous salt is crystallized, for sale. In this respect reference should be made for example to Italian patent No. 1,191,650 in the name of the present applicant.

However, in recent times, the market demand for pure sodium sulphate has decreased and the tendency is for this decrease to continue, with the result that processes which include the recovery of commercial anhydrous sodium sulphate have currently lost part of their initial interest.

A further drawback in this respect is that the soda required for desulphation of the active mass is often subject to market price rises, which makes its use inconvenient.

If the aforesaid recovery processes use calcium hydroxide for neutralizing the acid, the calcium sulphate is separated by filtration and the filter cake is despatched to controlled dumps. In this case there is an obvious serious environment impact as such residues always contain a certain amount of heavy metals.

OBJECTS AND SUMMARY OF THE INVENTION

The object of the present invention is therefore to solve the aforesaid commercial and environmental problems of the known art. This object is attained according to the present invention by a process for recovering the components of spent lead acid batteries of the type comprising an active mass desulphurization stage in which sodium sulplate is formed, characterised in that the sodium sulphate solution thus formed is fed to an electrolysis stage in which a soda solution is produced at the cathode and a sulphuric acid solution is produced at the anode. The soda solution produced at the cathode is recycled to the active mass desulphurization stage, and the sulphuric acid solution produced at the anode is recovered for reuse as battery electrolyte in the production of new lead acid batteries.

In a preferred embodiment of the present invention, the sulphuric electrolyte of the old spent batteries is also collected before and during the initial battery crushing stage and is neutralized with a caustic soda solution in accordance with the reaction:

$$H_2SO_4 + 2NaOH \rightarrow Na_2SO_4 + 2H_2O \qquad (1)$$

The active mass is desulphurized using an NaOH solution which puts all the sulphate ions into solution, leaving the active mass practically free of sulphur, in accordance with the reaction:

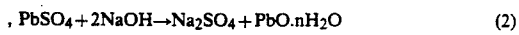
$$, PbSO_4 + 2NaOH \rightarrow Na_2SO_4 + PbO.nH_2O \qquad (2)$$

Before using the $Na_2SO_4$ solutions obtained in reactions (1) and (2), their pH should be adjusted to 9.2, which represents the point of minimum solubility of Pb in alkaline solutions. This adjustment is made by simply adding $H_2SO_4$ to the solutions in question. The $Na_2SO_4$ solution thus freed of heavy metals is fed to the electrolysis stage, which is conducted in a double ionic membrane electrolytic cell to produce a NaOH solution at the cathode and a $H_2SO_4$ solution at the anode.

Both the solutions obtained in this electrolysis must be concentrated for reuse. The first, to be reused to neutralize the sulphuric acid and as the desulphurizing agent for the active mass, must be concentrated to 20% by weight. The second, to be reused as new battery electrolyte, must be concentrated to 35% by weight The result of the present invention is therefore that by recycling the sodium within the process, the soda is electrolytically recovered for reuse in the first stage of the process, and sulphuric acid solution is formed of suitable purity for new battery production requirements. It is immediately apparent that the following advantages are substantially obtained: the sulphuric acid of the old batteries, inpure because it contains heavy metals and as such no longer usable for battery production, is totally regenerated instead of producing neutralization salts to be dumped as toxic or harmful residues.

In addition, the sulphur contained in the active mass is converted into its original form, i.e. into pure sulphuric acid for batteries. This also overcomes the sodium sulphate marketing problem, the demand for which is continually decreasing on the market as stated.

BRIEF DESCRIPTION OF THE DRAWINGS

By way of non-limiting example the process of the invention is illustrated schematically on the figure of the accompanying drawing, which represents a block diagram of a possible embodiment of the process.

BRIEF DESCRIPTION OF THE PREFERRED EMBODIMENTS

In this diagram, the reference numeral 1 indicates a stock of scrap of spent lead acid batteries. These are fed to a crushing stage 2 and then to a wet screening stage 3. From here the flow line 4 indicates the material fed for recovery of antimony lead and the battery plastic components, while the flow line 5 leads to the recovery in the block 6 of the turbid material together with the paste or active mass. The active mass from 6 undergoes desulphurization in a device 7 by treatment with caustic soda, in accordance with the aforesaid reaction $PbSO_4 + 2NaOH \rightarrow Na_2SO_4 +$ 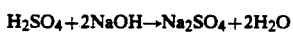 $NH_2O$ .

The products of this reaction are filtered in a filter 8, with consequent separation of the solution 9 containing sodium sulphate from the desulphurized active mass 10, which is fed to an electrolytic lead recovery stage.

The sodium sulphate solution 9 is subjected to electrolysis in 11 with simultaneous production of a sulphuric acid solution 12 at the anode and soda 13 at the cathode. This soda (after suitable concentration) is recycled along the flow line 14 to the desulphurization stage 7 of the active mass 6. The sulphuric acid solution 12 is suitable concentrated in 15 and fed to a recovery stage 16 for its reuse as electrolyte for new batteries.

In the process flow diagram shown on the accompanying drawing the block 7 can comprise not only the desulphurization of the active mass but also the neutralization of sulphuric acid constituting the electrolyte recovered from the spent batteries, in accordance with the reaction indicated by the equation $H_2SO_4 + 2NaOH \rightarrow Na_2SO_4 + 2H_2O$.

A non-limiting embodiment of the process of the invention is described hereinafter to better illustrate its characteristics and advantages.

EXAMPLE

An old spent battery weighing 13 kg contains 2.6 kg of 12% $H_2SO_4$ electrolyte and 5.2 kg of active mass containing 6% S. The electrolyte contains As, Sb, Cu, Ni and Mn at levels which prohibit its reuse in a new battery.

270 g of NaOH are required for its neutralization and to attain the ph required for precipitation of said impurities. 830 g of NaOH are required to desulphurize the active mass and to attain the pH representing minimum Pb solubility in alkaline solution.

This makes a total of 1100 g of NaOH in about 9.0 liters of solution.

After the reaction, 1950 g of $Na_2SO_4$ in about 11.5 liters of solution are separated by filtration.

This solution is fed to an electrolytic cell comprising a double anionic and cationic membrane between platinum plated titanium anodes and iron cathodes.

Adding the further water required for the process, 1345 g of $H_2SO_4$ in 10% solution are obtained from the anode compartment and 1100 g of NaOH in 10% solution from the cathode compartment.

Both the solutions must be concentrated by evaporation before reuse, in the manner described.

As is apparent from the aforegoing description and example, the process of the invention represents a satisfactory and advantageous solution to the initially stated problems of the known art.

We claim:

1. A process for recovering the components of spent lead acid batteries comprising:

(A) subjecting said batteries to desulphurization in a desulphurization stage to form a sodium sulphate solution; then
   (B) subjecting said sodium sulphate solution to electrolysis in a device having an anode and a cathode and producing a sulphuric acid solution at said anode and a soda solution at said cathode; and then
   (C) recycling said soda solution to said desulphurization stage and recovering said sulphuric acid solution for reuse as a battery electrolyte in the production of new acid lead batteries.

2. The process as claimed in claim 1, further comprising the steps of initially removing sulphuric electrolyte from said spent lead batteries and neutralizing said sulphuric electroltye using a portion of said soda solution produced in said electrolysis step.

3. The process as claimed in claim 1, further comprising the steps of concentrating said sulphuric acid solution before recovering said sulphuric acid solution and concentrating said soda solution before recycling said soda solution.

4. The process as claimed in claim 3, wherein said electrolysis step comprises conducting electrolysis in a double ionic membrane electrolytic cell.

5. The process as claimed in claim 4, wherein said step of concentrating said sulphuric acid solution comprises concentrating said sulphuric acid solution to 35% by weight, and said step of concentrating said soda solution comprises concentrating said soda solution to 20% by weight.

6. The process as claimed in claim 1, further comprising the step of adjusting the pH value of said sodium sulphate solution to a predetermined value prior to recycling said sodium sulphate solution, said predetermined value representing a minimum lead solubility in a alkaline solution.

7. The process as claimed in claim 6, wherein said step of adjusting said pH comprises adjusting said pH to 9.2.

8. The process as claimed in claim 1, wherein said step of producing a soda solution at said cathode comprises producing sodium hydroxide.

9. The process as claimed in claim 1, wherein said step of subjecting said batteries to desulphurization comprises the step of desulphurisizing said batteries using sodium hydroxide.

* * * * *